April 2, 1957     N. H. SMITH     2,787,203

GARDEN TOOL

Filed March 23, 1955

Nathan H. Smith
INVENTOR.

BY *Clarence A. O'Brien*
*and Harvey B. Jacobson*
Attorneys

United States Patent Office 2,787,203
Patented Apr. 2, 1957

2,787,203

GARDEN TOOL

Nathan H. Smith, Philadelphia, Pa.

Application March 23, 1955, Serial No. 496,123

1 Claim. (Cl. 97—61)

The present invention relates to new and useful improvements in garden implements, and has for its primary object to provide, in a manner as hereinafter set forth, a hand tool of this character embodying a novel construction and arrangement of parts whereby, with a minimum of effort, the soil may be manually harrowed preparatory to planting and expeditiously worked or cultivated after the crop is up.

Another important object of the invention is to provide, in a hand harrow and cultivator of the aforementioned character comprising a toothed head plate and an elongated handle, novel means for firmly securing said plate on one end portion of said handle.

Other objects of the invention are to provide a garden tool of the character described which will be comparatively simple in construction, strong, durable, compact, light in weight, efficient in use, and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
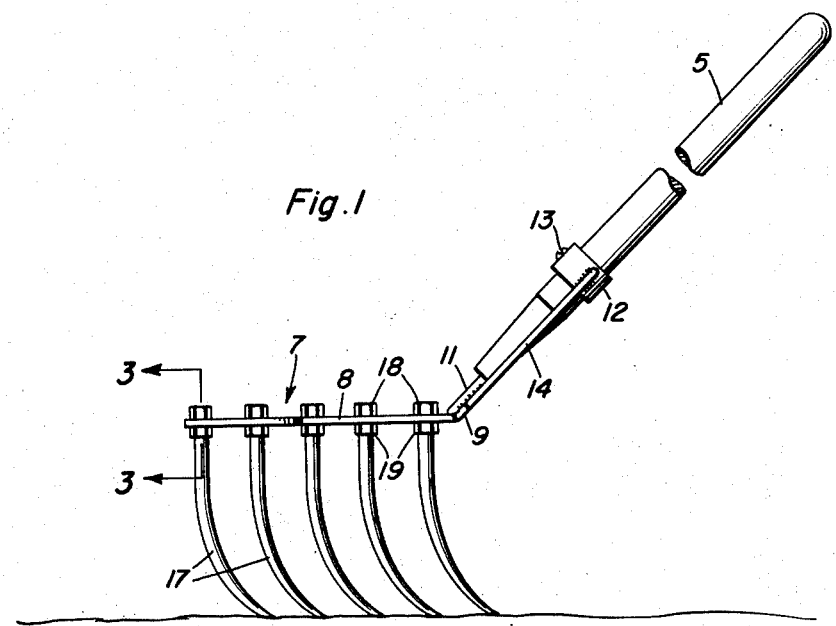
Figure 1 is a view in side elevation of a garden tool constructed in accordance with the present invention.

Referring now to the drawing in detail, it will be seen that the embodiment of the invention which has been illustrated comprises an elongated handle 5 of suitable wood. The handle 5, which may be of any desired length, terminates in a tapered forward end portion 6. Mounted on the forward end portion of the handle 5 is a head which is designated generally by reference character 7.

Figure 2:
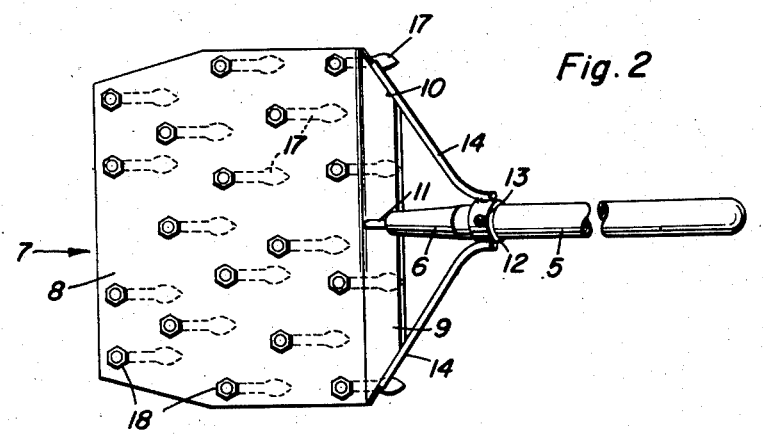
Figure 2 is a top plan view of the device.
Figure 3:
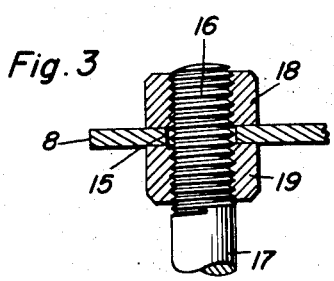
Figure 3 is a fragmentary view in vertical section, taken substantially on the line 3—3 of Figure 1.

The head 7 includes a horizontal metallic plate 8 of suitable dimensions, which plate is of substantially the shape shown to advantage in Figure 2 of the drawing. The plate 8 comprises an upwardly inclined rear marginal portion 9 having convergent side edges 10. Fixed as by welding at an intermediate point on the portion 9 of the plate 8 and projecting upwardly and rearwardly therefrom is a tang 11 which is anchored longitudinally in the end portion 6 of the handle 5. A metallic ring 12 is secured by a screw 13 on the handle 5. Metallic braces 14 for the head 7 have one end portion welded to the ring 12 and their other end portions welded to the side edges 10 of the rear marginal portion 9 of the plate 8.

The plate 8 has formed therein transverse rows of staggered openings 15 for the reception of the threaded upper end portions 16 of a plurality of downwardly and rearwardly curved teeth 17 of suitable metal. Upper and lower nuts 18 and 19, respectively, are threaded on the end portions 16 of the teeth 17 above and below the plate 8 for firmly securing said teeth in position on said plate.

It is thought that the use of the tool will be readily apparent from a consideration of the foregoing. It will be observed that the handle 5 extends at an upward and rearward inclination from the horizontal plate 8. For harrowing, the head 7 is moved forwardly and rearwardly over the ground in an obvious manner, the teeth 17 rapidly breaking up all clods and preparing the soil for planting. The construction and arrangement of the implement is such that a comparatively large area may be rapidly prepared with a minimum of physical effort. To work the crop after it is up, the tool is simply pulled up one side of the row and moved down the other side.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

A garden tool of the character described comprising: an elongated wooden handle, and a head mounted on one end portion of said handle, said head including a horizontal metallic plate comprising an upwardly inclined rear marginal portion having convergent side edges, a tang fixed at an intermediate point on said inclined marginal portion of said plate and anchored longitudinally in said one end portion of said handle, a ring mounted on the handle, a screw securing said ring on said handle, braces for the head having one end portion affixed to said ring and their other end portions affixed to said convergent side edges of said inclined plate portion in parallelism therewith, and a plurality of downwardly and rearwardly curved teeth fixed on the plate.

References Cited in the file of this patent

UNITED STATES PATENTS

| | | |
|---|---|---|
| 877,614 | Thompson | Jan. 28, 1908 |
| 1,616,590 | McCarthy | Feb. 8, 1927 |
| 2,026,078 | Walker | Dec. 31, 1935 |
| 2,143,660 | Polillo | Jan. 10, 1939 |